US007001624B2

(12) United States Patent
Golz

(10) Patent No.: US 7,001,624 B2
(45) Date of Patent: Feb. 21, 2006

(54) METHOD FOR MIXING AND INTRODUCTION OF INULIN

(75) Inventor: David I. Golz, Freeport, IL (US)

(73) Assignee: Encore Technologies, L.L.C., Minnetonka, MN (US)

( * ) Notice: Subject to any disclaimer, the term of this patent is extended or adjusted under 35 U.S.C. 154(b) by 407 days.

(21) Appl. No.: 10/206,876

(22) Filed: Jul. 26, 2002

(65) Prior Publication Data

US 2003/0113428 A1    Jun. 19, 2003

Related U.S. Application Data

(60) Provisional application No. 60/342,232, filed on Dec. 19, 2001.

(51) Int. Cl.
    A23K 1/00 (2006.01)
(52) U.S. Cl. .......................... 426/2; 426/548; 426/805; 426/807
(58) Field of Classification Search ................... 426/2, 426/548, 805, 807
    See application file for complete search history.

(56) References Cited

U.S. PATENT DOCUMENTS

| 1,616,169 | A | * | 2/1927 | Arsem | 127/38 |
| 1,616,170 | A | * | 2/1927 | Arsem | 426/658 |
| 2,283,867 | A | * | 5/1942 | Flosdorf et al. | 312/31 |
| 4,688,520 | A | * | 8/1987 | Parks | 119/51.11 |
| 5,925,190 | A | * | 7/1999 | Richards | 127/34 |
| 6,720,020 | B1 | * | 4/2004 | Karleskind et al. | 426/590 |
| 2001/0051134 | A1 | * | 12/2001 | Pandya | 424/44 |

OTHER PUBLICATIONS

"Inulin", www.pdrhealth.com. ; http://www.pdrhealth.com/drug_info/nmdrugprofiles/nutsupdrugs/inu_0299.shtml., Jun. 2003.*

Abstract of Ammerman E., Quarrels, C. and Twining Jr., "Effect of dietary fructo-oligosaccharides on fee efficiency in floor pen-reared male broilers" *Poultry Science 67 (Supl. 1):1*, 1988.

Abstract of Ammerman, E. Quarrels, C. & Twining, P.V. 1989, "Evaluation of fructooligosaccharides", *Poultry Sci. 67 (Supl. 1)*:1988.

Bailey, J.S. Blakenship et al, "Effect of Furctooligosaccharide on Samonella colonization fo the chicken Intestine", Poultryry Science 70:2433-2438, 1991.

Best , Peter, "Starter Pig Feeds: Oligosaccharides, Do these feed sugars assist the right bacteria?," Feed Int., Feb. pp. 24-28, 2000.

Bunce T.J., et al, "Protective Effect of Furctooligosaccharide (FOS) in Prevention of Mortality and Morbidity from infections *E. coli*," K:88 *J. Anim. Sci* 73 (*Suppl. 1*): 69,1995.

Bunce T.J. et al., "Feeding Furcto-olgosaccharide to Calves Increased Bifidobacteria and Decreased *Escherichia coli*,," *J. Anum Sci.* 73 (*Suppl. 1*) 281, 1995.

Catala, I Butel et al., "Oligofurctose Contributes to the Protective role of Bifodobacteria in Experimental Necrotising Enterocolitis in Quails," *J. Med. Microgbiol.* 48 pp. 89-94, 1999.

Chambers J. R. et al., "The Influence of Complex Carbohydrates on *Salmonella typhimurium* Colonization, pH, and Density of Broiler Ceca", *Poultry Science* 76:445-451, 1997.

Choi, K.H. et al., "Effects of Dietary Fructooligosaccharides on the Suppression of Intestinal Colonization of *Salmonella typhimurium* in Broiler Chickens", *Korean J. Anim. Sci* 3:271-284, 1994.

Diez M. Hornick, et al., "Influence of a Blend of Fructo-Oligosaccharides and Sugar Beet Fiber on Nutrient Digestibility and Plasma Metabolite Concentrations in Healthy Beagles," *Am. J. Vet. Res.* 58:1248-1242, 1997.

Diez et al., "Etude Des Fibres alimentaires Chez Le Chien: Presentation des Resultants de 7 Essais Experimentaux", *Ann. Med. Vet* 142: 185-201, 1998.

Diez, et al., "The IInfluence of Sugar-Beet Fibre, Guar gum and Inulin on Nutrient Digestibility, Water consumption and Plasma Metabolites in Healthy Beagle Dogs", *Research in Veterinary Science* 64: 91-96, 1998.

Farnworth, et al., "the Use of Jerusalem Artichoke flour in Pig and Chicken Diets", *In Inulin and Inulin-Containing Crops*.pp. 385-389, 1993.

Fukata et al., "Inhibitory Effects of Competitive Exclusion and Fructooligosaccharide, Singly and in Combination, on Salmonella Colonization of Chicks", *J. Food Prot.* 62:229-33, 1999.

Gebbink et al., "Effects of Addition of Furctooligosaccharide (FOS) and Sugar Beet Pulp to Weanling Pig Diets on Performance, Microflora and Intestinal Health", *Purdue Unitveristy Swine Day Report*, 1999.

Gibson et al., "Enrichment of Bifidobacteria from Human Gut Contents by Oligofructose Using Continuous Culture", *FEMS Mecrobiol. Lett. 118*:pp. 121-127, 1994.

Gibson et al., "Selective Stimulation of bifidobacteria in the Human colon by Oligofructose and Inulin", *Gastroenterology* 108: pp. 975-982, 1995.

(Continued)

Primary Examiner—C. Sayala
(74) Attorney, Agent, or Firm—Vidas, Arrett & Steinkraus, P.A.

(57) ABSTRACT

The method for mixing and introduction of inulin facilitates health in young animals. In general, Inulin in a dry form will be combined with dry citric acid, an FDA approved colorant, and a moisture scavenger. The combined dry product will then be mixed and subsequently mixed with water, where the typical dry mixture will be 75% to 85% Inulin, 20% to 25% citric acid, and less than 1% colorant and moisture scavenger. The mixed solution may then be diluted to a minimum concentration of 1 part solution to 128 parts water for introduction to young animals.

21 Claims, 2 Drawing Sheets

OTHER PUBLICATIONS

Figure 1:
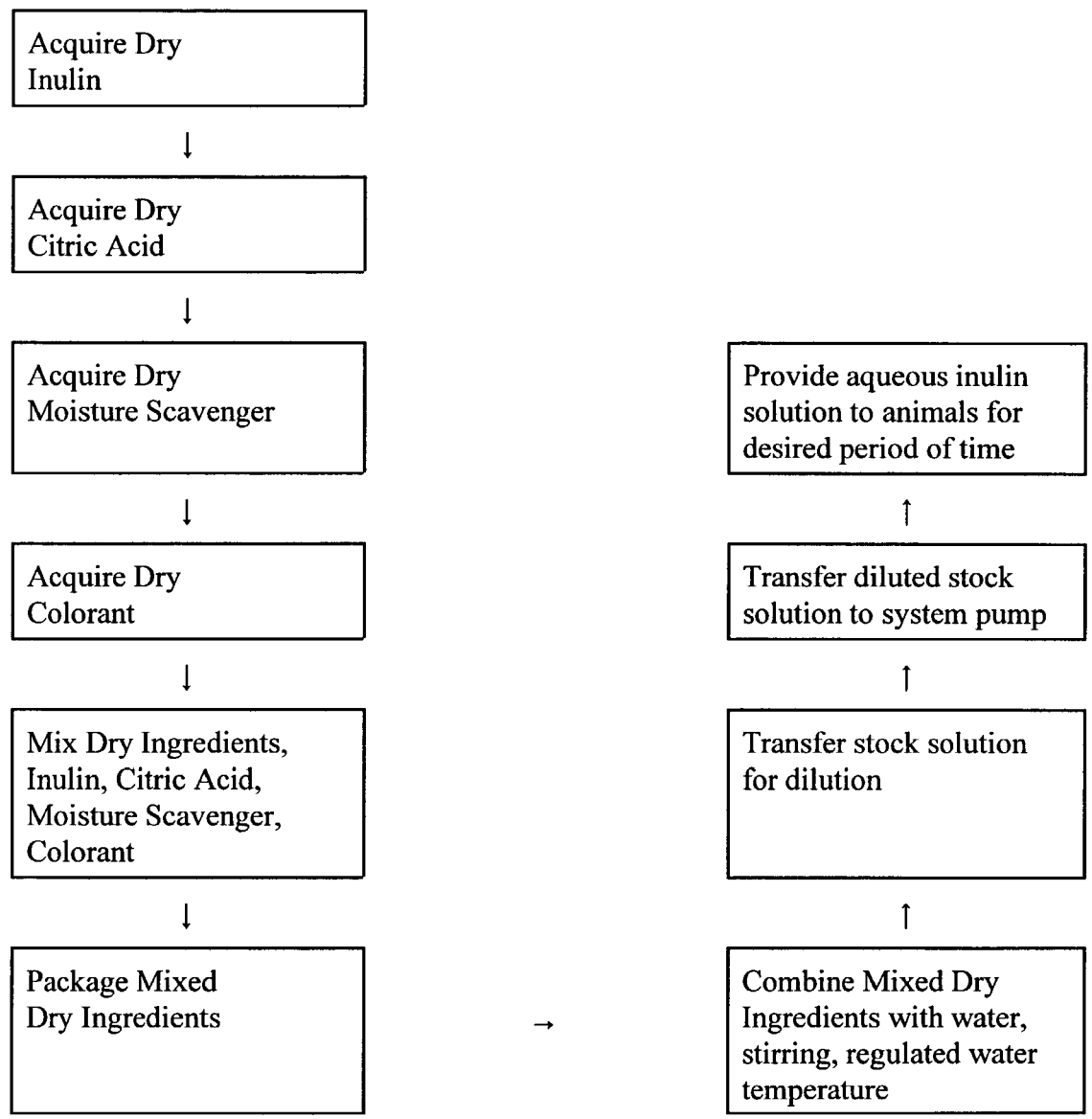

Graham et al., "Composition and Digestion in the Pig Gastrointestinal Tract of Jerusalem Artichoke Tubers", *Food Chemistry* 22: 67-76, 1986.

Howard et al,., "Effects of Dietary Supplementation with Furctooligosaccharides on Colonic Microbiota Populations and Epithelial Cell Proliferation in Neonatal Pigs", *J. Ped Gastroenterol, Nutr.* 21:297-303, 1995.

Houdijk et al., "Furctooligosaccharides and Transgalactooligosaccharides in Weaner Pigs' Diet", *Proc. Int. Symp. Non-Digestivle Oligosaccharides: Healthy Food for the colon?, the Netherlands*, pp. 67-78, Dec. 1997.

Hussein et al., "Petfood Applications of Inulin and Oligofructose", *J. Jutr.* 129: 1454S-1456S, 1999.

Kobayashi et al., "Effects of Fructo-Oligosaccharides on Mil-Yield and Milk-Components of Dairy Cows", *AJAS.* 3:21-25, 1990.

Letellier et al, "Assessment of Vaious Treatments to Reduce Carriage of Sammonella in Swine", *The Canadian Journal of Veterinary Research* 67:27-31, 2000.

Morsse et al., "Assessment of the Activity of Fructo-Oligosaccharide on Different Caecal Parameters in Rabbits Experimentally Infected with *E. coli* 0.103", *Annales de Zootechnie* 42:81-87, 1993.

Mul et al., "The Role of Fructo-Oligosaccharides in Animal Nutrition", *Garnsworthy, P.C. & Cole, D.J.A., eds.* pp. 57-59 *Nottingham University Press*, Nottingham UK, 1994.

Nemcova et al., "Study of the Effect of Lactobacillus Paracasei and Fructooligosacchareds on the Faecal Microflora in Wenling Piglets", *Berl. Munch. Tieraztl. Wschr.* 112; 225-228, 1999.

Okey R, "Studies on the Behavior of Inulin in the Animal Body", *J. Viol. Chemistry* 39: 149-162, 1920.

Oli et al., "Evaluation of Fructooligosaccharide supplementation of Oral Electrolyte Solutions for Treatment of Diarrhea", *Dig. Dis. Sci* 43: 138-147, 1998.

Oyarzabal et al., "In Vitro Fructooligosaccharide Untilization and Inhibition of *Salmonella* spp. By Selected Bacteria", *Dept. of Poultry Science and Alabama Agricultural Experiment Station*, pp. 1418-1425, 1995.

Oyarzabal, et al, "Fructooligosaccharide Utilization by Samonelle and Potential Direct-Fed-Microbial Bacteria for Poultry", *Journal of Food Protection*, vol. 58, 1995.

Oyarzabal et al., "Application of Direct-Fed Microbial Bacteria dn Fructooligosaccharides for Salmonella Control in Broilers During Feed Withdrawal", *Poultry Science* 75: 186-190, 1996.

Roberfroid et al., "Dietary Fructans", *Ann. Rev. Nutr.* 18: 117-143, 1998.

Russell et al., Supplementation of Nursery Diets with Furctooligosaccharide Enhances Growth Performance of the Weaned Pig, *J. Anim. Sci* 74 (*Suppl.*) 61, 1996.

Schoeni et al., "Inhibition of Campylobacter jejuni Colonization in Chicks by Defined Competitive Exclusion Bacteria", *Appl. Environ. Microbiol* 60:1191-1197, 1994.

Sparkes, et al., "Effect of Dietary Supplementation with Fructooligosaccharides on Fecal Flora of Healthy Cats", *AJVR*, vol. 59, No. 4, Apr. 1998.

Spiegel et al., "Safety and Benefits of Fructooligosaccharides as Food Ingredients", *Food Technol*, Jan. 85-89, 1994.

Strickling et al, "Evaluation of Oligosaccharide Addition to Dog Diets: Influences on Nutrient Digestion and Microbial Polulations", *Animal Feed Sci & Technol.* 86: 205-219, 2000.

Sunvold et al., "Dietary Fiber for Dogs: IV. InVitro Fermentation of Selected Fiber Sources by Dog Fecal inoculum and In Vivo Digestion and Metabolism of Fiber-Supplemented Diets", *J. Animal Sci.* 73:1099-1109, 1995.

Waldroup et al, "An Evaluation of Fructooligosaccharide in Diets for Brioler Chickens and Effects on Salmonellae Contamination of Carcasses", *Poultry Science* 72:643-650, 1993.

Willard, Effects of Dietary Supplementation of Fructo-oligasaccharides on Small Intestinal Bacterial Overgrowth in Dogs, *Am. J. Vet. Res.* 55:654-659, 1994.

* cited by examiner

METHOD FOR MIXING AND INTRODUCTION OF INULIN

CLAIM TO PRIORITY

The present application is a utility application for a "Method for Mixing and Introduction of Inulin" claiming priority to U.S. Provisional Application Ser. No. 60/342,232 filed Dec. 19, 2001, the entire contents of which is incorporated herein by reference.

BACKGROUND OF THE INVENTION

Animal health is susceptible to undesirable bacteria including, but not limited to, *Salmonella, Listeria, Shigella, Campylobacter, Enteropathogenic, Escherichia Coli, Clostridia,* as well as other bacteria. To improve animal health numerous supplements have been provided in a water source and/or food supply for animals where the supplements include, but are not necessarily limited to, antibiotics, vitamins, and/or fibers.

One reason that supplements are provided to animals is to improve gut health. Gut health or physiology may be improved by increasing the colonization of bifidobacterium, and/or lactobacillus which are considered to beneficial to the health of the animal. Generally, the large intestine of the animal is the most heavily colonized region of the digestive tract for normal microflora. Gut physiology and increased colonization of microflora, bifidobacterium, and/or lactobacillus, is normally improved through a fermentation process where colonic bacteria produce short chained fatty acids due to carbohydrate and protein formation.

Inulin has been shown to improve the growth of *Bifidobacteria* and *Lactobacillus* species in the terminal ileum, cecum, large intestine, and colon of animals.

Inulin may be derived from the root of the Chicory plant identified as (*Chicorium Intybus*), Agave (*Agave Azul Tequilana*), and Jerusalem Artichoke (*Helianthus Tuberosus*). Inulin is a naturally occurring substrate that belongs to a class of carbohydrates known as fructans and is found in roots, stems, leaves, and seeds of over 36,000 plants worldwide, including thousands of common edible plants and fruits. Inulin serves as an energy reserve carbohydrate for an animal.

Inulin is a source of soluble fermentable fiber in the diet of animals. Inulin, the soluble fiber, is fermented by non-pathogenic bacteria in the terminal ileum, cecum, large intestine, and colon of the animal. This fermentation produces short chain fatty acids which help to lower gut pH and provide substrate energy to the villi in the intestine. Gut microbiota play a major role in animal health and there exists a benefit to adding a source of fermentable fiber, such as inulin, to food for its prebiotic properties. Inulin has been shown to beneficially alter the composition of gut microflora and to improve the intestinal microbial balance to favor growth of beneficial microorganisms.

Inulin is a fructan characterized by the β2-1 linkages of fructose chains and usually has only a single terminal glucose molecule. However, the length of the fructose chains is variable and depends upon the plant source, time of harvest, and duration and conditions of post storage. The degree of polymerization of inulin may range from 2 to greater than 60.

Inulin is a soluble dietary fiber. Inulin as consumed by animals has also been shown to resist digestion, be fermented by colonic microflora, particularly *Bifidobacteria* and *Lactobacillus*, which produce short-chained fatty acids that reduce hindgut pH. Inulin has many beneficial effects when consumed by animal species such as pigs, cows, horses, poultry, dogs, cats, rabbits, and/or rodents.

The inulin intake by livestock or other animals is dependent upon the concentration of the fructans present in the diet and the quantity of fructan-containing ingredients included in the given diet.

In the past, inulin has been mixed by farmers in five gallon buckets utilizing a stirring rod. The inulin generally initiates as dry material, and when water is added, and mixing is attempted, results in severe clumping of the inulin failing to provide a homogeneous mixture which may be further diluted with water for introduction to animals.

BRIEF DESCRIPTION OF THE INVENTION

The method for mixing and introduction of inulin relates to the improvement in health in young animals. In general, inulin in a dry form will be combined with dry citric acid, an FDA approved color, and a moisture scavenger. The combined dry product will then be mixed where the typical mixture will be greater than 50% and more preferably be between 75% to 85% inulin, to not more than 49% citric acid or combinations of organic acids, and less than 1% colorant and moisture scavenger. The dry blend of ingredients is then combined with water during mixing resulting in improved mixability of the solution where the mixed solution may be diluted to 1 part solution to 128 parts water prior to the provision to animals. The pre-mixing of the dry ingredients and subsequent hydrolyzation with water during further mixing significantly reduces, if not eliminates, the balling and/or clumping of the inulin within the mixture. The aqueous solution which is free of balls or clumps is easily combined into a water system for consumption by animals.

It is a principal advantage of the present invention to provide a mixed aqueous solution including inulin which is relatively cost effective, easy to mix, and which fulfills the intended purpose of minimizing balling and/or clumping within the solution without risk of health to animals and/or damage to property.

It is another principal advantage of the present invention to provide a mixed inulin aqueous solution to animals for a maximum of the first 30 days postweaning to help improve gut health.

It is another principal advantage of the present invention to provide a mixed inulin aqueous solution to the animals of an older age to help improve gut health.

It is still another principal advantage of the present invention to provide pre-mixed dry ingredients including inulin prior to the addition of water to minimize balling and/or clumping of the inulin during combination with water.

It is still another principal advantage of the present invention to provide a mixed inulin and aqueous solution which may be easily and readily passed through an animal watering system and/or pumping equipment minimizing risk of clogging of the water delivery apparatus.

It is still another principal advantage of the present invention to provide an inulin and aqueous solution which minimizes waste when provided to animals.

Still another principal advantage of the present invention of the present invention is to provide a mixed inulin and aqueous solution where inulin forms between 75% to 85% of the pre-mixed dry ingredients for the solution.

It is still another principal advantage of the present invention to provide mixed inulin aqueous solution where dry citric acid forms between 20% and 25% of the pre-mixed dry ingredients prior to formation into a solution.

It is still another principal advantage of the present invention to provide a mixed inulin aqueous solution where dry colorant and dry moisture scavenger form approximately 1% of the pre-mixed dry ingredients prior to formation of the solution.

It is still another principal advantage of the present invention to enhance the ease and speed of dispensing an aqueous solution containing inulin for consumption by an animal.

It is still another principal advantage of the present invention to enhance the growth of an animal through the consumption of an aqueous solution including inulin.

BRIEF DESCRIPTION OF THE SEVERAL VIEWS OF THE DRAWING(S)

Figure 2:
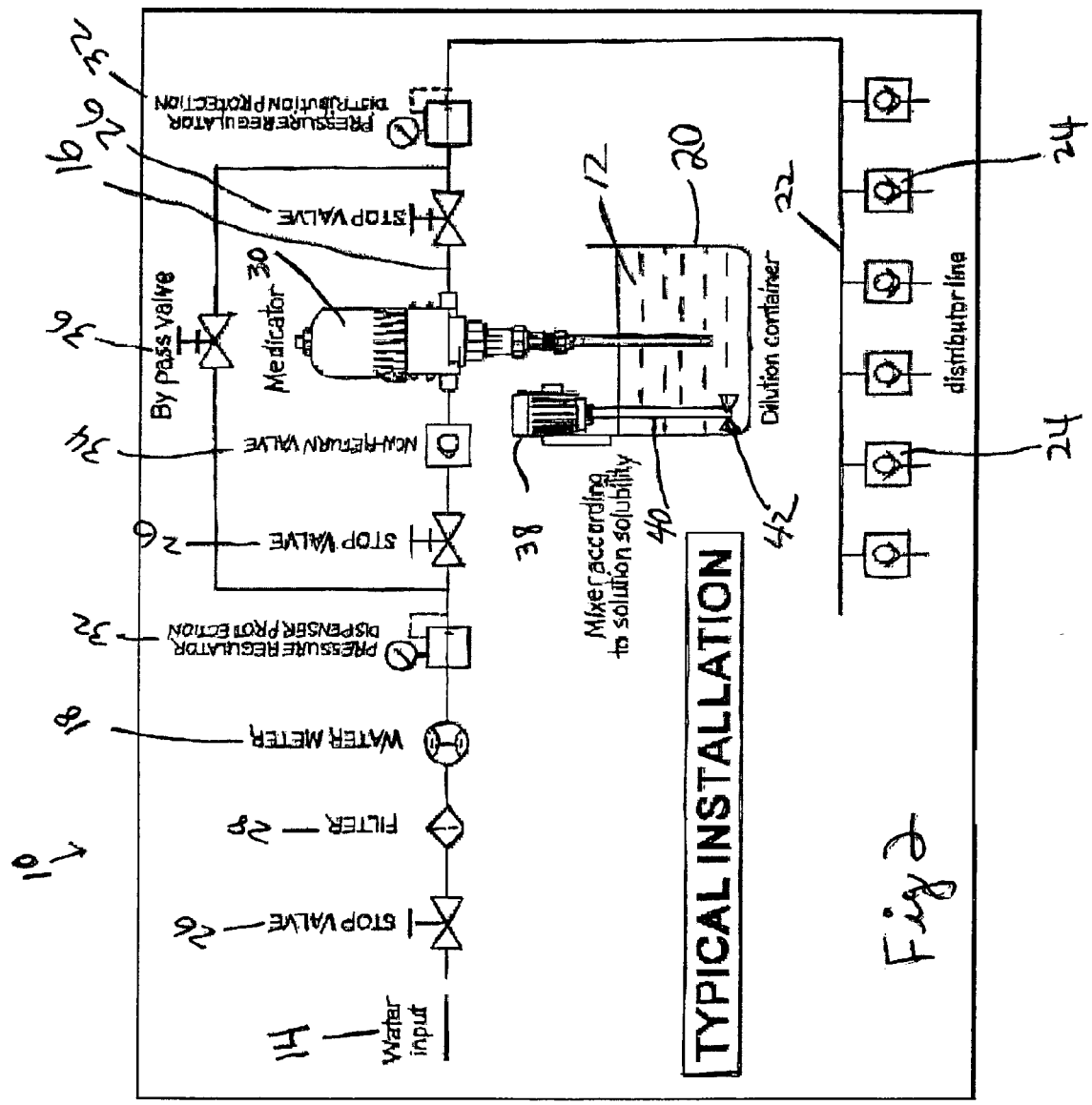

FIG. 1 shows a block diagram of the method for mixing and introduction of inulin; and FIG. 2 shows an schematic of a typical animal watering system.

DETAILED DESCRIPTION OF THE INVENTION

The method for mixing and introduction of Inulin to an animal may initiate with the acquisition of dry Inulin. Dry Inulin may then be combined with dry citric acid, an FDA approved colorant, and a moisture scavenger. The combined dry product may then be mixed and packaged in a sealed container to prevent moisture contamination for storage and/or shipment to a farmer for use in the feeding to animals.

In the past, both Inulin and citric acid have been used separately to minimize health problems in young animals. Citric acid has been primarily utilized to assist in the acidification of the intestine preventing growth of pathogenic organisms in the gut. Inulin has been provided to animals to increase the growth of beneficial bacteria which leads to improved gut health and less scouring.

In the past, it has been difficult to mix Inulin with water. Typically the Inulin tends to ball up and/or clump when combined with water requiring significant time for mixing. In the past, extremely high water temperatures have been needed to counter the balling and/or clumping tendencies of the Inulin within water. Citric acid is extremely soluble and may be added to a solution readily.

The components of dry Inulin, dry citric acid, a dry colorant, and dry moisture scavengers may be combined into one dry product. This product may then be mixed and provided in water so that the animal consumes 0.5 to 8 trams of inulin per day for a maximum of the first 30 days postweaning. In general, the dry product will be added and mixed to water during stirring. The water temperature utilized during mixing should be, at minimum, 50° F. and at maximum less than 115° F. Typical mixing instructions would be to add 1.25 lb. of the dry mixed Inulin product to one gallon of water to create a stock solution. This stock solution is then dispensed to the animals using a medicator unit 30 as a portion of a dispensing system 10 shown in FIG. 2. The amount of diluted solution for consumption by an animal will be dependent upon the daily volume of water intake. In the event that an animal has relatively low daily water intake the concentration of inulin may be significantly increased above the 1 part inulin solution to 128 parts water which is anticipated to be a minimum concentration for daily consumption by animals.

A portion of the invention involves the manufacture by mixing of dry ingredients together. Typically, the dry mixture will include 75% to 80% Inulin, 20% to 25% dry citric acid, and less than 1% dry colorant and moisture scavenger.

The main benefit of the aqueous inulin solution is that the pre-combination of dry Inulin and dry citric acid mixes with water significantly more easily than straight Inulin and water allowing for faster and easier dispersing of an inulin solution product to animals for consumption. The benefits to the animal include but are not necessarily limited to better growth and feed efficiency, lower scouring and improved gut physiology. Further, the dilution of mixed Inulin, citric acid, water, and coloring, facilitates easy incorporation of Inulin into the water systems utilized to transfer the solution for consumption by animals.

Two types of medicators 30 are typically used. Both are based upon movement of water through a pump with the stock solution 12 being added to the drinking water. In one case, the water 14 and solution 12 are directly mixed in the pump. In the other system, the stock solution 12 is injected into a water line 16. Both systems are coupled to water lines in the same manner. In addition, both systems are compatible with the disclosed invention herein.

One type of medicator 30 is installed directly in the water supply line 16. This medicator dispenser operates without electricity, using water pressure as the power source. During passage through the system water activates the dispenser which takes up the required percentage of stock solution 12 inside the dispenser, where the stock solution 21 is mixed with the water 14. The water pressure forces the solution downstream. Once set, the dispenser requires no further attention. The dose of concentration of inulin will always be strictly proportional to the volume of water entering the dispenser. Variations in flow or pressure may thereby occur in the main line. Typical settings are 1 part stock solution to 128 parts water. The dispenser's high metering accuracy through use of a meter 18 eliminates any risk of overdosing, thus helping to safeguard the environment.

The second type of medicator 30 includes a non-electric water motor which functions on demand with water flow. Inside the water motor is a fixed diaphragm assembly that travels up and down with alternative filling of the upper chamber and the lower chambers of the motor. Only water travels through the water motor. The diaphragm is made of a heavy fiber mesh which may be coated with rubber. This water motor is not affected by sandy or dirty water which may be utilized within the system.

Inserted into the bottom of the water motor is a positive displacement chemical pump. The pump draws directly from a stock solution container 20 and injects the water into the line 16 which is able to sustain the use of chemicals being pumped through the water line. Positive displacement indicates that the chemical stock solution 12 is being injected on both the up and down stroke of the pump.

A typical dispensing system 10 may also include, but is not necessarily limited to use of additional components identified as, stop valves 26, water filters 28, pressure regulators 32, non-return or one-way valves 34, and/or by-pass valves 36.

Generally, the stock solution 12 is mixed within a stock solution container 20 through the use of an electrically powered mixer 38 which includes a shaft 40 having mixing paddles 42. The mixer 38 is preferably portable and easily attachable and removable from the wall of a stock solution container.

The solution is obtained by the animal by drinking from either water nipples or water bowls which may be mounted in a distributor line 22 having individual units 24 in the pens for the animals. The water intake of pigs may vary but is typically between 1 and 2 liters per day in pigs for pigs which are receiving inulin less than 30 days after weaning. Water intake of pigs may be as high as 5 to 6 liters per day when consumed by older market pigs.

Citric acid may be found in beverages manufactured in other industries. Inulin is used most commonly to provide soluble fiber in baked goods and other human foods. In general, in the past, Inulin has been used as a source of soluble fiber for consumption by an animal. Initially, a dry blend may be formed using 1 lb. dry Inulin to ¼lb. dry citric acid and 0.05 lbs. dry color which is usually identified as FDA No. 5 or No. 6; and 0.05 lbs of dry moisture scavenger. The moisture scavenger may be silica or sodium aluminum oscillate. Following mixing the dry blend may then be mixed with 1 gallon of water and stirred to provide a mixed solution which does not form balls or clumps. The gallon of water may then be incorporated into a system pump which may be gravity fed to a water pump where 1 part of the mixed liquid is diluted to a maximum of 128 parts water where a gravity dispenser introduces the diluted mixed inulin solution to animals. It should be noted that a higher concentration of mixed inulin solution is available in excess of the 1 part mixture to 128 parts water where the higher concentration of inulin solution is desired. The dilution identified herein of 1 part mixture to 128 parts water is anticipated to be the minimum concentration of Inulin mixture for consumption by animals.

The mixing of dry citric acid with dry Inulin minimizes balling and/or clumping when combined with water to provide better mixed properties than Inulin and \or water independently.

In order to obtain inulin, Chicory roots may be acquired and washed using a process and equipment similar to those used in the sugar beet industry. The washed Chicory roots may then be processed by scalding. Following the scalding process, the Chicory roots may be fed into the bottom of a diffusion tower where the inulin may be extracted in a continuous counter current mode at temperatures of between 60° C. to 70° C. Pressed Chicory root pulp may be dried and further sold as cattle feed. The inulin liquid removed from the diffusion tower is generally referred to as "raw liquid" which may be returned to the scalding process. After the raw liquid is removed from the scalder, the pH of the raw liquid may be adjusted to approximately 3.5 to 4.0. Adjustment of the pH may occur through the addition of sulfuric acid. The viscous constitutes of the raw liquid are precipitated from the solution through the addition of one or more flocculents. The remaining inulin liquid is then generally referred to as "clear liquid" which may be cooled to a temperature between 20° C. and 30° C. which in turn may then be processed through a demineralization procedure. In the demineralization procedure the "clear liquid" may pass through a cation exchange resin and subsequent anion exchange resin. Cooling of the "clear liquid" prior to contact with the acidic environment of the cation exchange resin prevents hydrolysis of the inulin and discoloration of the "clear liquid". The processed "clear liquid" may then pass through a granular activated carbon filter where the highly purified "clear liquid" may be concentrated from 13% to 16% dry matter to 30% to 35% dry matter by water evaporation at low temperature such as below 90° C. and reduced air pressure less than 0.8 bar. The concentrated "clear liquid" may then be spray dried to a final concentration of greater than 95% dry matter and the resulting inulin powder.

Generally, inulin and the related β1-2 fructans are not digested in the small intestine by animals and therefore may pass unchanged to the large intestine where they are available to serve as prebiotics. Inulin may be used as a substrate for gastrointestinal microflora, particularly *Bifidobacteria* and *Lactobacillus*, which are considered beneficial in maintaining intestinal health for an animal. The large intestine of an animal is the most heavily colonized region of the digestive tract and the composition of the bacteria which comprise the normal microflora is an important factor in animal health. Through the process of fermentation, colonic bacteria influence gut physiology as well as having other systemic effects. The colonic bacteria produce short chain fatty acids as a result of carbohydrate and protein fermentation which may then be salvaged by the physiology of the host animal for receipt of energy through the absorption of the short chain fatty acids. The short chain fatty acids are metabolically utilized by various tissue, butyrate by the colonic epithelium, propionate, L-lactate, and acetate by the liver, and acetate by muscle and other peripheral tissue. Inulin generally serves as a preferential substrate for growth of *Bifidobacteria* and/or *Lactobacillus*. *Bifidobacteria* and *Lactobacillus* have been recognized as beneficial micro organisms in the colon with inhibitory effects on the growth of potential pathogens such as bacterioids, clostridia, or coliforms. The predominance of *Bifidobacteria* and/or *Lactobacillus* is a result of its ability to ferment inulin faster than most competitive species or the drop in the pH may be due to the fermentation of inulin which creates a more favorable environment for the *Bifidobacteria* and/or *Lactobacillus* than for the pathogenic organisms. *Bifidobacteria* and/or *Lactobacillus* grow faster on inulin than on glucose which implies that the *Bifidobacteria* may possess a specific mechanism for either uptake or fermentation of inulin. *Bifidobacteria* and/or *Lactobacillus* may accumulate inulin intra cellularly by means of a specific uptake mechanism.

Inulin may be fed to pigs, cows, horses, chickens, dogs, and/or cats, to assist in a stressful period of transition from milk to solid feed and to decrease *E. Coli* within the colon of an animal. Inulin may also stimulate growth of endogenous bacteria and prevent mortality and morbidity of animals affected with *E. Coli*. Inulin may also potentially help prevent and/or reduce parasite infection within animals. Inulin may further serve as a substrate for use in antibiotics in promoting growth. The use of inulin in animals improves the composition of the gut microflora and increases populations of *Bifidobacteria* and/or *Lactobacillus* and reduces pathogenic species, improves intestinal cellular morphology, enhances nutrient absorption, and reduces order of feces while simultaneously increasing the feed conversion ratios promoting the health of the animal. The beneficial effects may be particularly useful during adverse periods of weaning or environmental stress. Inulin may also be used in poultry to facilitate health during confinement and/or environmental stress.

Typically the inulin product may be mixed manually through the use of a stirring stick or wire whisk. Mechanical means of mixing may consist of using an electric drill having a mixing attachment which may be readily acquired and designated for the other uses of mixing paint or other materials. Magnetic stir bars may also be utilized on a magnetic stir plate for mixing. It is important to add the inulin mixture to the amount of solution utilized as the stock solution within the invention.

Colorants are utilized within the stock solution to show how well the product is mixing and that the product contains the desired inulin solution.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below (e.g. claim 3 may be taken as alternatively dependent from claim 2; claim 4 may be taken as alternatively dependent on claim 2, or on claim 3; claim 6 may be taken as alternatively dependent from claim 5; etc.).

This completes the description of the preferred and alternative embodiments of the invention. Those skilled in the art may recognize other equivalents to the specific embodiment described herein which equivalents are intended to be encompassed by the claims attached hereto.

What is claimed is:

1. A method of making a feed for animals, said feed comprising inulin, the method comprising the steps of:
   a) obtaining dry inulin;
   b) obtaining dry citric acid; and
   c) mixing the dry inulin with the dry citric acid to form a dry feed; and
   d) combining the mixed dry inulin and dry citric acid with water at a temperature between about 50° F. and about 115° F. to form an aqueous feed mixture comprising inulin, the combination of citric acid with inulin effective to minimize clumping of the inulin in the aqueous feed mixture.

2. The method according to claim 1, further comprising mixing the dry inulin and dry citric acid during the combination with water.

3. The method according to claim 2, wherein said mixing occurs by stirring.

4. The method according to claim 1, further comprising the addition and mixing of dry FDA approved colorant prior to combination with water.

5. The method according to claim 4, further comprising the addition and mixing of a dry moisture scavenger prior to combination with water.

6. The method according to claim 1, further comprising the addition and mixing of a dry moisture scavenger prior to the addition of water.

7. The method according to claim 6, wherein said moisture scavenger is silica.

8. The method according to claim 6, wherein said moisture scavenger is sodium aluminum oscillate.

9. The method according to claim 1, wherein said dry inulin and said dry citric acid are pre-mixed and packaged to prevent moisture contamination prior to combination with water.

10. The method according to claim 1, wherein said aqueous solution including inulin is provided in a volume of less than or equal to 4 gallons per day for an animal for a period of time of at least 14 days.

11. The method according to claim 1, wherein said water is combined to said dry inulin and said dry citric acid where said water has a temperature of at least 50° F.

12. The method according to claim 11, wherein said water is combined to said dry inulin and to said dry citric acid where said water has a temperature of equal to or less than 115° F.

13. The method according to claim 1, wherein 1 lb. of the mixed dry inulin and dry citric acid is combined with 1 gallon of water for creation of a stock solution.

14. The method according to claim 13, wherein said stock solution is transferred to a medicator for dilution of said stock solution in water.

15. The method according to claim 14, wherein said dilution of said stock solution does not exceed 1 part stock solution to 128 parts water.

16. The method according to claim 14, further comprising transferring said diluted stock solution to a water delivery apparatus where said water delivery apparatus introduces said diluted stock solution to an animal.

17. The method according to claim 16, said water delivery apparatus comprising a system pump and a gravity dispenser.

18. The method according to claim 5, said inulin comprising between 75% and 80% by weight of said dry mixture; said citric acid comprising between 20% and 25% by weight of said dry mixture; and said dry colorant and said dry moisture scavenger comprising less than or equal to 1% by weight of said dry mixture; wherein the percent weights of said inulin, said citric acid, said dry colorant, and said dry moisture scavenger equal 100%.

19. The method according to claim 5, said inulin comprising 1 lb., said citric acid comprising ¼ lb., said dry colorant comprising 0.05 lbs., and said dry moisture scavenger comprising 0.05 lbs.

20. A method of feeding animals, the method comprising the steps of:
   a) obtaining a dry feed, said dry feed comprising dry inulin and dry citric acid; and
   b) mixing said dry feed with water at a temperature of about 50° F. to about 115° F. to provide an aqueous mixture, the aqueous mixture comprising inulin.

21. The method according to claim 20, the method further comprising the step of feeding said aqueous mixture to said animals.

* * * * *